United States Patent Office 3,402,670
Patented Sept. 24, 1968

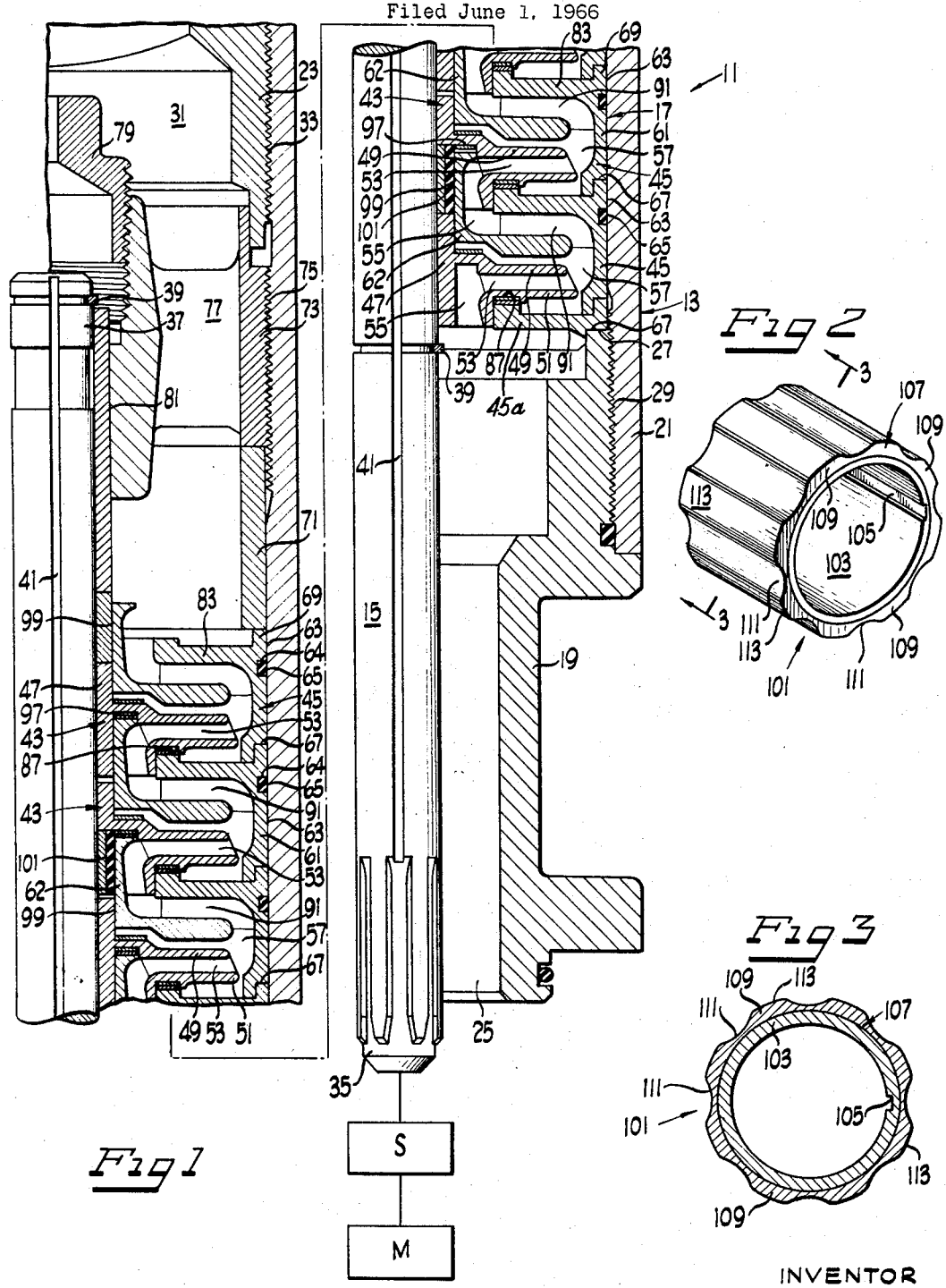
Sept. 24, 1968 — C. A. BOYD — 3,402,670
RUBBER BEARING FOR MULTISTAGE PUMP
Filed June 1, 1966
INVENTOR
CLINT A. BOYD

3,402,670
RUBBER BEARING FOR MULTISTAGE PUMP
Clinton A. Boyd, Tulsa, Okla., assignor to Borg-Warner Corporation, Chicago, Ill., a corporation of Illinois
Filed June 1, 1966, Ser. No. 554,490
3 Claims. (Cl. 103—102)

ABSTRACT OF THE DISCLOSURE

A bearing for a rotatable shaft including an axially extending annular ring connected to a rotatable shaft the ring having an annular resilient section including a plurality of axially extending radially directed spaced apart ribs extending outwardly of said ring and including outer arcuate surfaces. A multistage submersible pump for suitable use in an abrasive environment is shown incorporating such a bearing to support the drive shaft of said pump.

---

This invention relates to bearings. More particularly it relates to bearings suitable for use in apparatus for pumping well fluid from oil and water wells.

A serious problem which is encountered in the pumping of well fluid from oil and water wells is that of bearing wear. The bearings of such pumps are subjected to an environment which is extremely abrasive. This condition is caused by the presence of large quantities of sand and other foreign particles in the pumped fluid. As this fluid flows between the relatively rotating surfaces of the bearings and the pump shaft, rapid errosion of the bearing surface is experienced.

Attempts have been made to provide bearings which are able to withstand these adverse conditions for extended periods. However, such bearing designs have proven to be relatively expensive and have contributed substantially to the complexity of the over-all pump design.

As an example, in one type of a pump for oil and water wells known as a submersible pump, the use of rubber or other resilient material for the bearing that supports the pump drive shaft has found general acceptance. In such pumps a large number of pump stages are used to accomplish the necessary pressurization of the fluid being pumped. As many as three hundred or more stages are not uncommon. These stages, comprising an impeller and diffuser, are usually coaxially aligned and stacked vertically within a shell or housing disposed in the well beneath the surface of the well fluid. As can be appreciated a relatively long drive shaft is necessary to transmit rotational effort from a prime mover, such as an electric motor, to the impellers of the pump. To provide adequate support for the drive shaft, separate sections called bearing sections are provided at regular intervals along the shaft between pump stages. The number and location of these bearing sections depends on the number of stages of the pump and consequently upon the length of the drive shaft. In extreme cases placement of such a bearing section between every fourth or fifth stage is necessary.

The bearing sections utilized to support the drive shaft of the pump are of an axial length substantially equal to the axial length of one stage of the pump. Therefore, though their presence is essential, use of these bearing sections contributes to the over-all length of the structure and to the length of the drive shaft which they support.

The bearing contained in the bearing section is held stationary relative to the drive shaft and usually includes a plurality of radially inwardly directed fluted portions formed of a resilient material. These fluted portions terminate in an inner diameter which defines a bearing surface in sliding contact with the shaft.

It has been found that in certain instances the support provided by the radially inwardly directed fluted portions is not sufficient to prevent excessive shaft vibration. Additionally, as the bearings are stationary the spaces between the flutes tend to collect abrasive particles which in turn contribute to excessive wear of the relatively rotating surfaces.

Accordingly, it is the principal object of the present invention to provide an improved form of bearing suitable for use in oil and water well pumps.

It is another object of the present invention to provide an improved form of bearing suitable for use in the presence of fluid containing abrasive particles.

It is still a further object of the present invention to provide an improved form of bearing which prevents the collection of abrasive particles in the bearing area.

It is another object of the present invention to provide an improved bearing suitable for use in oil and water well pumps which may be utilized in the pump structure without adding to the over-all length of the assembly.

These and other objects and advantages of the present invention will become apparent from the following description and the accompanying drawing.

In the drawing:

FIGURE 1 is a partially broken away sectional elevational view of a pump with one longitudinal half cut away and illustrating various features of the invention.

FIGURE 2 is a perspective view of a portion of the apparatus of FIGURE 1 illustrating certain particular features of the invention.

FIGURE 3 is a sectional view of a portion of the apparatus shown in FIGURE 2 taken generally along the line 3—3 of that figure.

Very generally, the present invention relates to an improved bearing suitable for use in pumps for oil and water wells. The invention is not, however, limited specifically to this particular application and the advantages of the invention are equally applicable to any similar arrangement including bearings exposed to fluid which contains abrasive particles. The application of the invention to an oil or water well pump is therefore to be considered as merely illustrative and does not in any way constitute a limitation of the scope of the invention.

The bearing of the present invention includes a resilient portion adapted to be rotated with a supported shaft within a cylindrical journal. The resilient portion includes a series of radical ribs and a series of axial grooves between adjacent ribs. The resilient nature of the ribs allow entrapped particles of sand or other abrasive substances to pass freely between the bearing and the journal without damage to either component. Once the particles enter the grooves between the resilient ribs the centrifugal force acting upon the particles because of the bearing rotation combined with gravitational forces and fluid pressure forces acting upon the particles cause them to be removed from the bearing area.

Referring now to the drawings and more particularly to FIGURE 1, there is shown a pump adapted for use in an oil or water well and illustrating an embodiment of the present invention.

The pump of the illustrated embodiment generally designated 11 is of the submersible type and is adapted to be disposed within the casing of an oil or water well beneath the surface of the well fluid. Typically, it is adapted to be associated with an electric motor and a seal assembly shown schematically at M and S, respectively, to provide a complete pumping apparatus for removal of well fluid. The assembled structure may include a gas separator (not shown) which may be disposed between the seal assembly and the pump and which defines a fluid inlet structure and serves to disperse entrained gases from the well fluid. Alternatively, a simple inlet structure may be used which merely allows well fluid to enter the pump without effecting removal of gases.

The pump 11 includes a housing 13, a rotatable drive shaft 15, and a plurality of pump stages 17 disposed within the housing.

The housing 13 includes a pump base 19 adapted to be connected to a gas separator or other inlet defining structure, a tubular wall 21 and a pump head section 23. The entire housing structure is disposed concentrically of the shaft 15.

The pump base 19 is spaced from the shaft 15 to define with the shaft, an inlet passage 25 which leads to the first of the stages 17. The pump base also includes a radially directed support surface 27 which is in contact with and provides support for the first of the pump stages. It further is provided with an outer threaded surface 29 to which is secured the tubular wall 21.

The pump head section 23 includes an end (not shown) adapted to be connected to a string of well pipe which conducts the pumped fluid to the surface. It additionally defines a fluid outlet passage 31 which receives the pumped fluid from the stages 17 for delivery to the pipe string. The pump head 23 is provided with an outer threaded surface 33 which is also secured to the tubular wall 21.

The shaft 15 includes a splined end 35 adapted to be connected to an output shaft of the motor M by an appropriate connector (not shown). The shaft extends the entire length of the tubular portion 21 of the housing 13 and terminates in an upper end 37. Groove and snap ring arrangements 39 are provided adjacent each end of the shaft to retain the shaft within the pump assembly.

A longitudinally extending keyway is provided in the shaft within which is disposed a key 41 operatively associated with the stages 17 to effect pumping of well fluid.

Each of the stages 17 of the pump 11 includes an impeller 43 and a diffuser 45 which cooperate to pump well fluid from the inlet 25 to the outlet 31.

The impellers 43 include an annular hub 47 keyed to the shaft 15 by the key 41 for rotation with the shaft. Each impeller further includes an inner and outer radially directed ring 49 and 51 connected by a plurality of webs 53. These rings define a fluid flow passage through the impeller which includes an axially directed inlet 55 and a radially directed outlet 57.

The diffusers 45 are arranged intermediate adjacent impellers and serve to direct the pumped fluid from the outlet 57 of one stage to the inlet 55 of the next stage. The diffusers include an outer axially extending ring 61 and an inner axially extending ring 62.

The outer axially extending ring 61 includes an axially extending cylindrical surface 63 in contact with the inner surface of the tubular wall 21. In this manner the diffusers are aligned coaxially with respect to the housing and consequently with respect to the shaft 15 and impellers 43. Each outer ring 61 is provided with a circumferential groove 64 at the surface 63. At periodic intervals, depending upon the requirements of the particular pump application, an O-ring seal 65 is disposed in the groove to provide a fluid-tight seal between the surface 63 and the tubular wall 21.

Each outer axially extending ring 61 further includes a stepped portion 67 at one axial end and an upstanding flange portion 69 at the opposite end. The stepped portion of the diffuser of one stage engages the upstanding flange portion 69 of the next suceeding diffuser. The stepped portion 67 of the bottom diffuser 45a, that is, the first diffuser adjacent the pump inlet passage 31, is supported upon the support surface 27 of the pump base 19.

The upstanding flange portion 69 of the uppermost diffuser, that is, the diffuser nearest the pump outlet passage 31 is in radially-directed contact with a compression tube 71. This tube is urged in a direction toward the pump base 19 by a retainer 73 secured to the tubular wall 21 as by threads 75. The outer axially extending rings 61 of the diffusers 45 are thus placed under a compressive load between the compressive tube 71 and the pump base 19 to effect retention of the diffusers in stationary relation with the housing and prevents their rotation within the tubular wall 21 during pumping.

The retainer 75 also includes radially inwardly directed webs 77 which extend across fluid outlet passage 31 and support an inner bearing cap 79 which surrounds the open end 37 of the shaft 15 and includes a journal surface 81.

A radially directed ring portion 83 is formed on the outer axially extending ring 61 adjacent the upstanding flange portion 69. This ring portion includes a bearing surface upon which is supported thrust bearing arrangement 87 which is in radial contact with the outer ring 51 of the impeller 43 and receives a portion of the thrust loads encountered during pumping.

The inner axially extending ring 62 of each diffuser is connected to the outer ring 61 by webs 91 and defines with that ring and the radially directed portion 83 a flow passage extending through the diffuser from the outlet 57 of one impeller to the inlet 55 of the next succeeding impeller. It should be noted that the bottom diffuser 45a of the pump does not include the webs 91 nor the inner axially extending ring 62.

The inner axial ring 62 includes a radially directed bearing surface. A thrust bearing arrangement 97 is interposed between the bearing surface of the inner ring 62 of the diffuser and the inner ring 49 of the impeller 43 which further serves to support the relatively rotating impellers and absorb thrust loads experienced during pumping.

Each of the inner axially extending rings 62 defines an axially extending cylindrical surface or journal 99 adjacent the shaft 15 and spaced from the shaft a distance approximately equal to the radial thickness of the hub 47 of the impeller 43. Preferably, the diameter of the cylindrical surface 99 is slightly larger than the diameter of the hub 49 to allow free relative rotation between these elements.

As is illustrated in FIGURE 1, the relative positions and axial lengths of the hubs 47 of the impellers 43 and the inner axially extending rings 62 of the diffusers 45 are such that a portion of each hub (except for the first stage) is disposed intermediate the shaft 15 and the inner axially extending ring 62 of one diffuser and another portion of the hub of the impeller is disposed intermediate the shaft 15 and the inner axially extending ring 62 of the next succeeding diffuser.

In accordance with the present invention, portions of the hubs 47 of certain of the impellers 43 are removed and a bearing element 101 is positioned intermediate the shaft and the cylindrical journal surface 99 at those locations. The number of such bearings and their frequency along the shaft length are critical only to the particular requirements of specific pump application and in no way constitute limitations to the scope of the present invention. In the most extreme case each impeller could be modified to the extent necessary to provide a bearing such as the bearing 101 within each stage of the pump assembly. It is, however, important to note that neither the number of bearings required, nor their presence in the pump assembly contributes to the over-all pump length or creates axially extending spaces between pump stages.

The bearing element 101, as seen in FIGURE 2, includes an inner axially extending rigid ring 103 having an internal diameter approximately equal to the diameter of the shaft 15. The ring 103 is disposed in axially extending contact with the shaft surface in the void provided by removal of a portion of the hub 47. This ring may be made of brass, bronze, or any other suitable material capable of satisfactory operation under exposure to well fluid. The ring 103 includes a keyway 105 formed at its inner diameter which receives the key 41, so that the bearing is rotatable with the shaft 15.

Upon the outer surface of the cylindrical member 103, there is provided a resilient section 107 formed of rubber, plastic, or any other appropriate elastomeric substance capable of operation in the pump environment. The resilient section 107 is bonded to the outer surface of the cylindrical member 103 and is therefore rotatable with that member and the shaft 15. The resilient section 107 is provided with a convolute outer surface defining a series of axially extending radially outwardly directed ribs 109 and grooves 111. The ribs include outer arcuate surfaces 113 formed upon a diameter approximating the diameter of the axially extending cylindrical journal surface 99 of the inner axially extending ring 62. The arcuate surfaces define an intermittent bearing surface which contacts the axially extending cylindrical surface 99. In this manner, the bearings 101 support the shaft 15 in concentric relation to the diffusers 43 and the tubular wall 21 of the pump housing. Placement of the bearing elements 101 along the shaft therefore provides adequate support for the shaft and prevents an excessive vibration of the shaft during pump operation.

The grooves 111 formed between the ribs 109 define passages or periodic gaps between the cylindrical surface 99 of the diffuser of the relatively rotating bearing element 101. Should sand or other abrasive particles enter the bearing area, the resilient ribs 109 are able to deflect upon entrapment of a particle or particles between the journal surface and the arcuate surface 113 to allow the particles to pass into the grooves 111 without damage to the cylindrical surface 99. Once the particles pass between these surfaces and enter one of the grooves 111 centrifugal force imparted to the particles by the rotating bearing, and gravitational forces and fluid pressures acting upon the particles cause them to move out of the bearing area.

As can be seen, a bearing has been provided which is suitable for operating in the presence of abrasive liquid and which is adapted to provide adequate support for a rotatable shaft without contributing to the over-all length of the shaft or the pump bearing. The bearing provided is not adversely affected by the presence of abrasive particles and further, is adapted to effect removal of the particles from the bearing area.

Various of the features of the invention have been particularly shown and described, however, it should be obvious to one skilled in the art that various modifications may be made therein without departing from the scope of the invention.

I claim:
1. A multistage pump having an axially extending rotatable drive shaft, a plurality of coaxially aligned stages including, a stationary diffuser and a relatively rotatable impeller connected to said shaft for rotation therewith, each said diffuser including an inner axially extending ring defining an axially elongated journal disposed in concentric spaced relation to said shaft, each said impeller including an annular hub surrounding said shaft disposed intermediate said shaft and at least a portion of said journal of at least one of said diffusers; at least one of said stages including an impeller having a hub sized to allow disposal of a bearing intermediate said shaft and said journal of said diffuser of that stage, said stage further including a bearing disposed intermediate said shaft and said journal comprising an axially extending annular ring connected to said shaft for rotation therewith and an annular resilient section secured to said annular ring exteriorly thereof including a plurality of axially extending radially directed spaced apart ribs extending outwardly of said ring including outer arcuate surfaces in bearing contact with portions of said journal.

2. A multistage pump as in claim 1 wherein said resilient section of said bearing includes a convolute outer surface defining said ribs and further defining axially extending grooves between adjacent ribs, the arcuate width of said grooves being at least as wide as the arcuate width of said outer arcuate surface of said ribs.

3. A multistage pump as in claim 2 wherein the arcuate width of said grooves is greater than the arcuate width of said outer arcuate surfaces of said ribs.

References Cited

UNITED STATES PATENTS

| | | | |
|---|---|---|---|
| 1,797,223 | 3/1931 | Annis | 308—238 |
| 2,270,666 | 1/1942 | Arutunoff | 103—108 |
| 2,678,606 | 5/1954 | Watson. | |
| 2,775,945 | 1/1957 | Arutunoff | 103—108 |
| 3,116,696 | 1/1964 | Deters. | |

HENRY F. RADUAZO, *Primary Examiner.*